United States Patent
Ito et al.

(10) Patent No.: US 11,199,213 B2
(45) Date of Patent: Dec. 14, 2021

(54) MOUNTING STRUCTURE AND CLIP

(71) Applicants: NIFCO INC., Kanagawa (JP); KABUSHIKI KAISHA TOYOTA JIDOSHOKKI, Aichi (JP); TOYOTA JIDOSHA KABUSHIKI KAISHA, Aichi-ken (JP)

(72) Inventors: Nobuyuki Ito, Kanagawa (JP); Yuya Inagaki, Aichi (JP)

(73) Assignees: NIFCO INC., Kanagawa (JP); KABUSHIKI KAISHA TOYOTA JIDOSHOKKI, Aichi (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 168 days.

(21) Appl. No.: 16/292,481

(22) Filed: Mar. 5, 2019

(65) Prior Publication Data
US 2019/0285106 A1   Sep. 19, 2019

(30) Foreign Application Priority Data

Mar. 16, 2018   (JP) .............................. JP2018-049725

(51) Int. Cl.
*F16B 19/00*   (2006.01)
*F16B 21/08*   (2006.01)
(Continued)

(52) U.S. Cl.
CPC .......... *F16B 19/004* (2013.01); *F16B 5/0628* (2013.01); *F16B 13/061* (2013.01);
(Continued)

(58) Field of Classification Search
CPC .... F16B 21/082; F16B 5/0628; F16B 19/004; F16B 31/061; F16B 21/06; F16B 21/183;
(Continued)

(56) References Cited

U.S. PATENT DOCUMENTS 3,893,365 A * 7/1975 Gross ..................... F16B 19/004
411/15
5,685,682 A * 11/1997 Glime ................... F16B 21/082
411/510

(Continued)

FOREIGN PATENT DOCUMENTS

GN   2740829 Y   11/2005
JP   H0861336 A   3/1996
(Continued)

OTHER PUBLICATIONS

Office Action for Japanese Patent Application No. 2018-049725 dated Jan. 28, 2020, pp. 1-2 (English translation not available).
(Continued)

*Primary Examiner* — Flemming Saether
(74) *Attorney, Agent, or Firm* — Thomas|Horstemeyer, LLP (57) ABSTRACT

A mounting structure has: a first member in which a first through-hole is formed; a second member in which a second through-hole is formed; and a clip having a first shaft portion, a first anchor portion that is anchored on an edge portion of the first through-hole, a second shaft portion whose axial center is eccentric with respect to an axial center of the first shaft portion, and a second anchor portion that is anchored on an edge portion of the second through-hole, wherein a cross-sectional shape of a portion, which is disposed at an inner side of the first-through hole, of the first shaft portion is a polygonal shape, and a length along a longest diagonal line of the polygonal shape, or a length of a longest side of the polygonal shape, is longer than a minimum opening length of the first through-hole.

7 Claims, 11 Drawing Sheets

(51) Int. Cl.
*F16B 13/06* (2006.01)
*F16B 21/18* (2006.01)
*F16B 21/06* (2006.01)
*F16B 5/06* (2006.01)

(52) U.S. Cl.
CPC ............ *F16B 21/06* (2013.01); *F16B 21/183* (2013.01); *F16B 21/082* (2013.01)

(58) Field of Classification Search
CPC ... Y10T 24/303; Y10T 24/304; Y10T 24/306; Y10T 24/307; Y10T 24/309
USPC .................................. 411/508–510, 388–389
See application file for complete search history.

(56) References Cited

U.S. PATENT DOCUMENTS

| | | | | |
|---|---|---|---|---|
| 7,798,740 B2* | 9/2010 | Kaufman | ................ | F16B 12/38 403/408.1 |
| 8,359,715 B2* | 1/2013 | Turner | .................. | F16B 5/0628 24/297 |
| 8,511,631 B2* | 8/2013 | Kato | .................... | B60R 13/0206 248/316.7 |
| 2015/0225971 A1* | 8/2015 | Gill | ........................... | E04G 5/14 182/112 |
| 2020/0232495 A1* | 7/2020 | Lepper | .................. | F16B 5/0628 |

FOREIGN PATENT DOCUMENTS

| | | |
|---|---|---|
| JP | H0882310 A | 3/1996 |
| JP | H10-184630 A | 7/1998 |
| JP | 2014-092232 A | 5/2014 |
| JP | 5613525 B2 | 10/2014 |
| JP | 2015-072021 A | 4/2015 |
| WO | WO 2012/108120 A1 * | 8/2012 |

OTHER PUBLICATIONS

Office Action for Chinese Patent Application No. 201910144659.7 dated Aug. 4, 2020, pp. 1-10 (Partial English Translation).

\* cited by examiner

MOUNTING STRUCTURE AND CLIP

CROSS-REFERENCE TO RELATED APPLICATION

This application is based on and claims priority under 35 USC 119 from Japanese Patent Application No. 2018-049725 filed on Mar. 16, 2018, the disclosure of which is incorporated by reference herein.

BACKGROUND

Technical Field

The present invention relates to a mounting structure and a clip.

Related Art

A clip in which the axial center of a second shaft portion is eccentric with respect to the axial center for a first shaft portion is disclosed in Japanese Patent No. 5613525. In this clip, because the axial center of the first shaft portion and the axial center of the second shaft portion are eccentric with respect to one another, mounting of a first member and a second member is possible even if there is relative positional offset between a first mounting hole of the first member, in which the first shaft portion is inserted, and a second mounting hole of the second member in which the second shaft portion is inserted.

By the way, in the clip disclosed in Japanese Patent No. 5613525, the second shaft portion is engaged with the second mounting hole so as to be rotatable and slidable and such that pulling-out of the second shaft portion from the second mounting hole is prevented. Therefore, it is difficult to maintain a state in which the relative positions of the first member and the second member are adjusted.

SUMMARY

In view of the above-described circumstances, the present disclosure provides a mounting structure and a clip at which the relative positions of a first member and a second member can be adjusted, and the first member and the second member can be held at the adjusted relative positions.

A mounting structure of a first aspect of the present disclosure includes: a first member in which a first through-hole is formed; a second member in which a second through-hole is formed, and to which the first member is mounted; and a clip having a first shaft portion that is inserted in the first through-hole, a first anchor portion that is provided at one end portion side of the first shaft portion and is anchored on an edge portion of the first through-hole, a second shaft portion that is provided at another end portion of the first shaft portion and is inserted in the second through-hole, and whose axial center is eccentric with respect to an axial center of the first shaft portion, and a second anchor portion that is provided at the second shaft portion and is anchored on an edge portion of the second through-hole, wherein a cross-sectional shape of a portion, which is disposed at an inner side of the first-through hole, of the first shaft portion is a polygonal shape, and a length along a longest diagonal line of the polygonal shape, or a length of a longest side of the polygonal shape, is longer than a minimum opening length of the first through-hole.

In the mounting structure of the first aspect, the first member and the second member are connected via the clip due to the first anchor portion being anchored on the edge portion of the first through-hole in the state in which the first shaft portion is inserted in the first through-hole, and the second anchor portion being anchored on the edge portion of the second through-hole in the state in which the second shaft portion is inserted in the second through-hole. In other words, the first member is mounted to the second member, or the second member is mounted to the first member, by the clip.

The above-described mounting structure uses the clip at which the axial center of the first shaft portion and the axial center of the second shaft portion are eccentric with respect to one another. Therefore, the relative positions of the first member and the second member can be adjusted around the first shaft portion or the second shaft portion. Further, at the clip, the cross-sectional shape of the portion of the first shaft portion, which portion is disposed at the inner side of the first through-hole, is a polygonal shape. The length along the longest diagonal line of the polygonal shape, or the length of the longest side of the polygonal shape, is longer than the minimum opening length of the first through-hole. Therefore, when the first member rotates with respect to the first shaft portion, the opposing corner portions or the adjacent corner portions of the polygonal shape respectively abut the hole wall of the first through-hole, and rotation of the first member is restricted. Due thereto, the relative positions of the first member and the second member can be maintained.

Due to the above, in accordance with the mounting structure of the first aspect, the relative positions of the first member and the second member can be adjusted, and the adjusted relative positions can be maintained, by the clip.

In a mounting structure of a second aspect of the present disclosure, in the mounting structure of the first aspect, corner portions of the polygonal shape are curved in circular arc shapes.

In accordance with the mounting structure of the second aspect, the cross-sectional shape of the portion, which is disposed at the inner side of the first through-hole, of the first shaft portion is a polygonal shape whose corner portions are curved in circular arc shapes. Therefore, crushing of the corner portions at the time when rotation of the first member is restricted can be suppressed as compared with, for example, a polygonal shape at which the corner portions are angular.

In a mounting structure of a third aspect of the present disclosure, in the mounting structure of the first aspect or the second aspect, a first flange portion that projects out toward a radial direction outer side of the first shaft portion is provided at a second shaft portion side of the first shaft portion, and an edge portion of the first through-hole is nipped by the first flange portion and the first anchor portion, and a second flange portion that projects out toward a radial direction outer side of the second shaft portion is provided at a first shaft portion side of the second shaft portion, and an edge portion of the second through-hole is nipped by the second flange portion and the second anchor portion.

In the mounting structure of the third aspect, in the state in which the first shaft portion is inserted in the first through-hole, the edge portion of the first through-hole is nipped by the first anchor portion and the first flange portion that projects out toward the radial direction outer side from the second shaft portion side of the first shaft portion. Therefore, the nipping pressure that is applied to the edge portion of the first through-hole becomes nearly uniform. Further, in the state in which the second shaft portion is inserted in the second through-hole, the edge portion of the second through-hole is nipped by the second anchor portion and the second flange portion that projects out toward the radial direction outer side from the first shaft portion side of the second shaft portion. Therefore, the nipping pressure that is applied to the edge portion of the second through-hole becomes nearly uniform.

Due thereto, stable mounting of the first member and the second member by the clip is ensured.

In a mounting structure of a fourth aspect of the present disclosure, in the mounting structure of any one of the first aspect through the third aspect, a direction indicating portion, which indicates a direction in which the first shaft portion and the second shaft portion are eccentric with respect to one another, is provided at at least one of the first shaft portion or the second shaft portion.

In the mounting structure of the fourth aspect, the direction indicating portion, which indicates the direction in which the first shaft portion and the second shaft portion are eccentric with respect to one another, is provided at at least one of the first shaft portion or the second shaft portion. Therefore, the direction in which the first shaft portion and the second shaft portion are eccentric with respect to one another can be understood merely by checking the direction indicating portion. Thus, the efficiency of the mounting work improves.

In a mounting structure of a fifth aspect of the present disclosure, in the mounting structure of any one of the first aspect through the fourth aspect, the first member is either one of a trim member for a vehicle or a panel member for a vehicle, and the second member is another of the trim member for a vehicle or the panel member for a vehicle.

In the mounting structure of the fifth aspect, the first member is either one of a trim member for a vehicle or a panel member for a vehicle, and the second member is another of the trim member and the panel member. Therefore, the relative positions of the trim member for a vehicle or the panel member for a vehicle can be adjusted, and the adjusted relative positions can be maintained, by the clip. Due thereto, the efficiency of the mounting work of the trim member and the panel member improves, and the manufacturing efficiency of the vehicle improves.

A clip of a sixth aspect of the present disclosure is clip for mounting a first member to a second member, and includes: a first shaft portion that is inserted in a first through-hole formed in the first member; a first anchor portion that is provided at one end portion side of the first shaft portion, and that is anchored on an edge portion of the first through-hole; a second shaft portion that is provided at another end portion of the first shaft portion, that is inserted in a second through-hole formed in the second member, and whose axial center is eccentric with respect to an axial center of the first shaft portion; and a second anchor portion that is provided at the second shaft portion, and that is anchored on an edge portion of the second through-hole, wherein a cross-sectional shape of a portion, which is disposed at an inner side of the first-through hole, of the first shaft portion is a polygonal shape, and a length along a longest diagonal line of the polygonal shape, or a length of a longest side of the polygonal shape, is longer than a minimum opening length of the first through-hole.

In the clip of the sixth aspect, when the first shaft portion is inserted in the first through-hole of the first member, the first anchor portion anchors on the edge portion of the first through-hole. When the second shaft portion is inserted in the second through-hole of the second member, the second anchor portion anchors on the edge portion of the second through-hole. Due thereto, the first member is mounted to the second member via the clip.

At the clip, the axial center of the first shaft portion and the axial center of the second shaft portion are eccentric with respect to one another. Therefore, the relative positions of the first member and the second member can be adjusted around the first shaft portion or the second shaft portion. Further, at the clip, the cross-sectional shape of the portion, which is disposed at the inner side of the first-through hole, of the first shaft portion is a polygonal shape. The length along the longest diagonal line of the polygonal shape, or the length of the longest side of the polygonal shape, is longer than the minimum opening length of the first through-hole. Therefore, when the first member rotates with respect to the first shaft portion, the opposing corner portions of the polygonal shape respectively abut the hole wall of the first through-hole, and rotation of the first member is restricted. Due thereto, the relative positions of the first member and the second member can be maintained.

Due to the above, in accordance with the clip of the sixth aspect, the relative positions of the first member and the second member can be adjusted, and the adjusted relative positions can be maintained.

The present disclosure can provide a mounting structure and a clip at which the relative positions of a first member and a second member can be adjusted, and the first member and the second member can be held at the adjusted relative positions.

BRIEF DESCRIPTION OF THE DRAWINGS

Exemplary embodiments of the present invention will be described in detail based on the following figures, wherein.

DETAILED DESCRIPTION

A mounting structure S relating to an embodiment of the present disclosure is described next by using FIG. 1 through FIG. 7. The mounting structure S of the present embodiment has a first member 12, a second member 16, and a clip 20.

Figure 1:
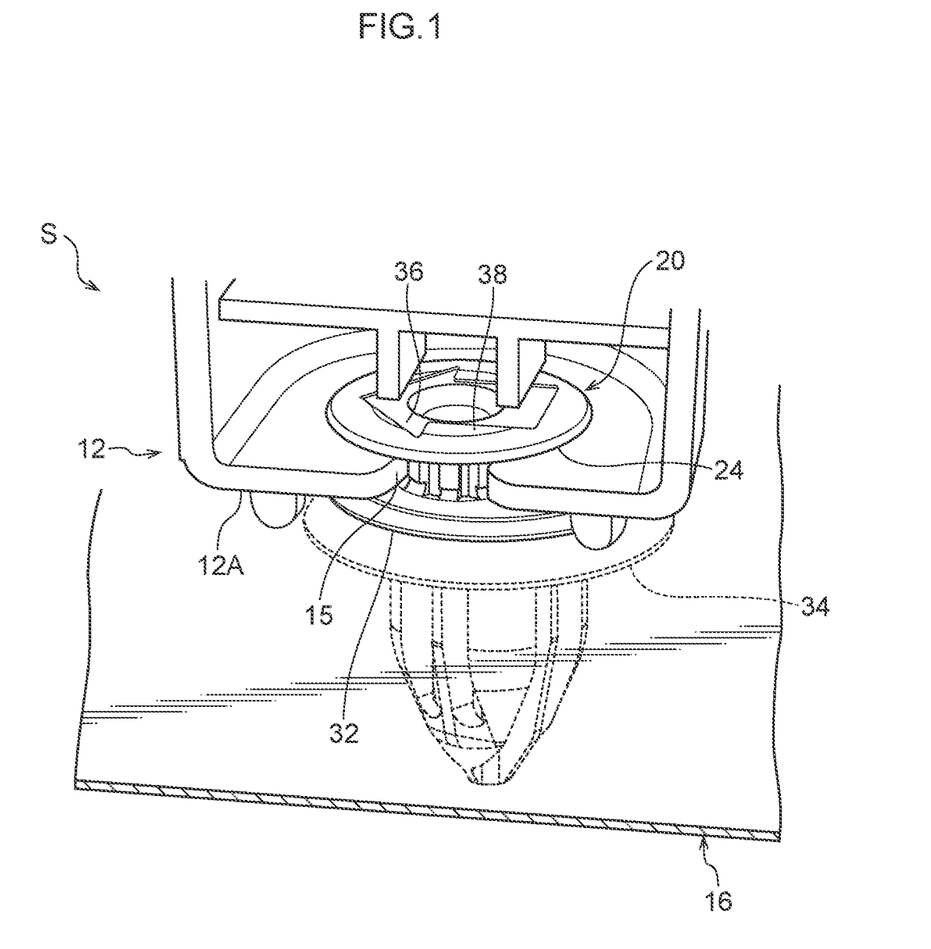
FIG. 1 is a perspective view showing a mounting structure and a clip relating to an embodiment of the present disclosure.
Figure 7:
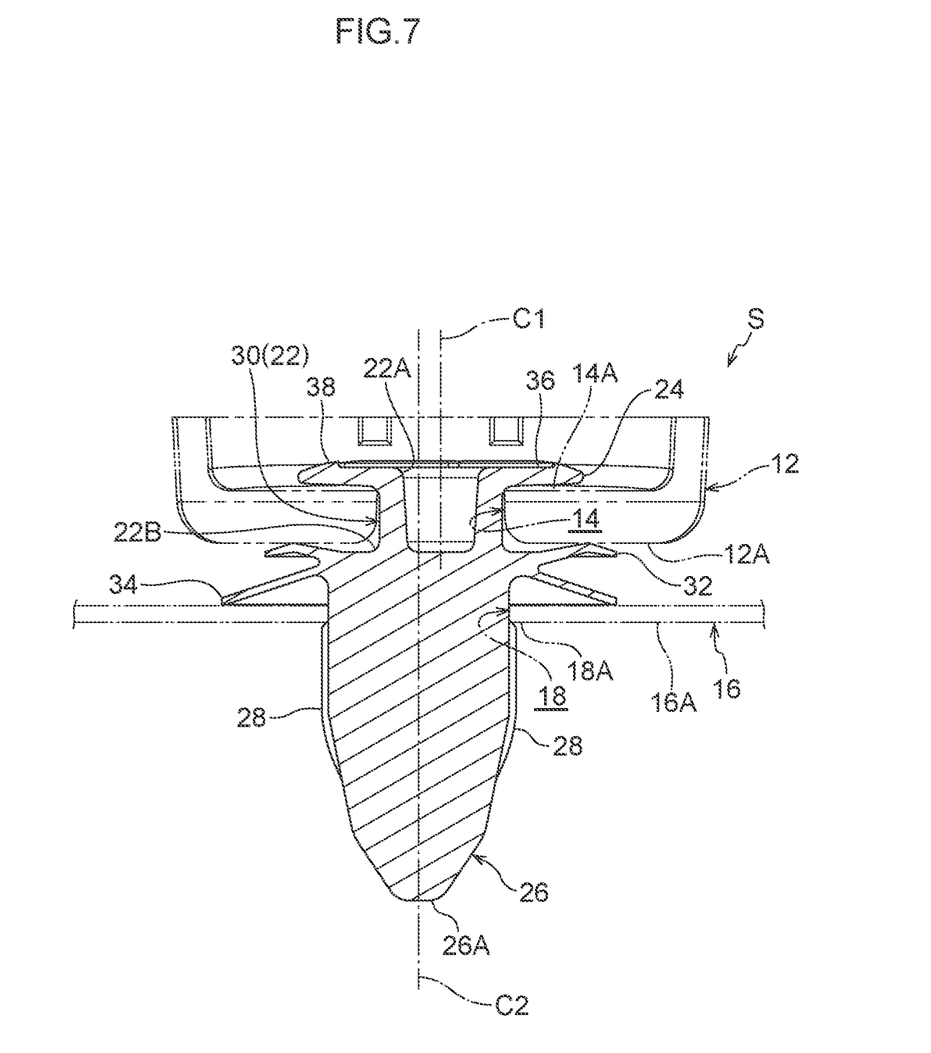
FIG. 7 is an enlarged sectional view along line 7X-7X of FIG. 6.

As shown in FIG. 1 and FIG. 7, the first member 12 has a plate-shaped portion 12A. A through-hole 14 is formed in the plate-shaped portion 12A. The through-hole 14 is a long hole, and a length direction one end portion of the through-hole 14 is connected to a cut-out 15 that is formed in an edge portion of the first member 12. Opening width W1 of the cut-out 15 is narrower than minimum opening width W2 of the through-hole 14. Note that the through-hole 14 of the present embodiment is an example of the first through-hole in the present disclosure, and the minimum opening width W2 is an example of the minimum opening length in the present disclosure.

Further, the first member 12 of the present embodiment is a trim member for a vehicle (e.g., a door trim).

As shown in FIG. 1 and FIG. 7, the second member 16 has a plate-shaped portion 16A. A through-hole 18 is formed in the plate-shaped portion 16A. The through-hole 18 is a circular hole. Note that the through-hole 18 of the present embodiment is an example of the second through-hole in the present disclosure.

Further, the second member 16 of the present embodiment is a panel member for a vehicle (e.g., an inner panel).

As shown in FIG. 1 and FIG. 7, the clip 20 is a part for mounting the first member 12 to the second member 16. The clip 20 has a first shaft portion 22, a first anchor portion 24, a second shaft portion 26 and second anchor portions 28.

The first shaft portion 22 is substantially shaped as a pillar, and is inserted in the through-hole 14.

The first anchor portion 24 is provided at a one end portion 22A (upper end portion in FIG. 7) side of the first shaft portion 22, and anchors on an edge portion 14A of the through-hole 14 in a state in which the first shaft portion 22 is inserted in the through-hole 14. In detail, the first anchor portion 24 is a portion that projects out from the first end portion 22A of the first shaft portion 22 toward the radial direction outer side of the first shaft portion 22, and, by abutting the edge portion 14A of the through-hole 14, functions to prevent pulling-out of the first shaft portion 22.

Figure 2:
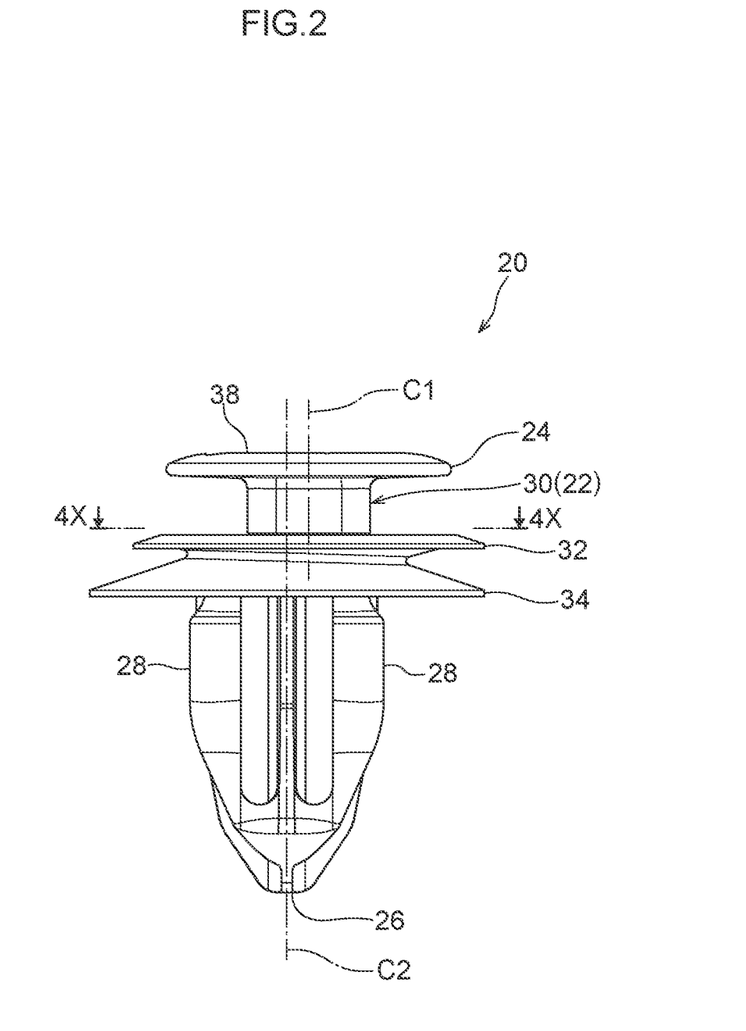
FIG. 2 is a front view of the clip shown in FIG. 1.
Figure 3:
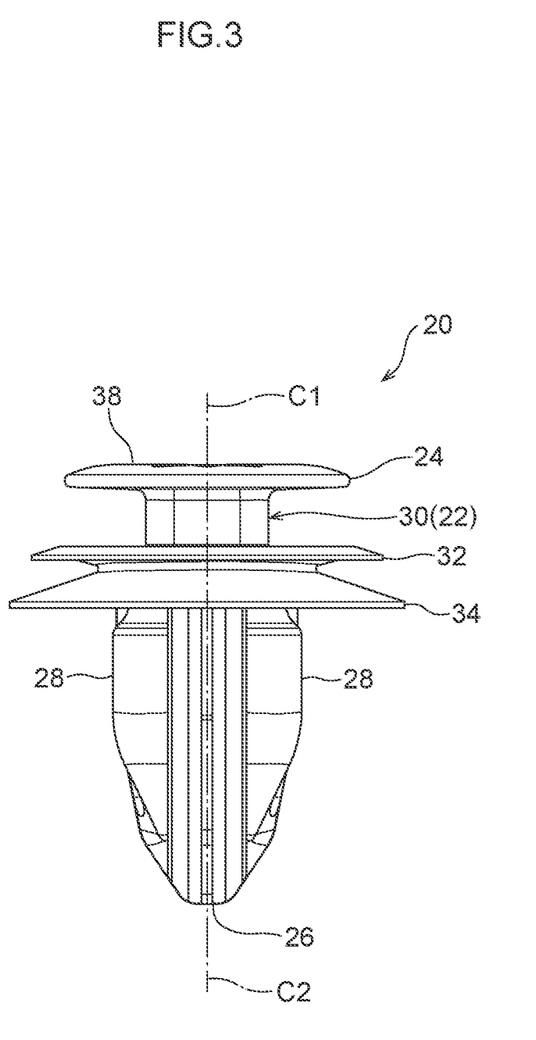
FIG. 3 is a side view of the clip shown in FIG. 1.

The second shaft portion 26 is provided at another end portion 22B (lower end portion in FIG. 7) of the first shaft portion 22, and extends in the direction opposite the extending direction of the first shaft portion 22. The second shaft portion 26 is substantially shaped as a pillar, and is inserted in the through-hole 18. Further, as shown in FIG. 2, axial center C2 of the second shaft portion 26 is eccentric with respect to axial center C1 of the first shaft portion 22.

The second anchor portions 28 are provided at the second shaft portion 26, and anchor on an edge portion 18A of the through-hole 18 in a state in which the second shaft portion 26 is inserted in the through-hole 18. In detail, the second anchor portions 28 are cantilevered elastic pieces that gradually move apart from the second shaft portion 26 from a one end portion 26A (lower end portion in FIG. 7) of the second shaft portion 26 toward the first shaft portion 22 side, and whose distal end portions abut the edge portion 18A of the through-hole 18. These elastic pieces are respectively formed at opposing positions of the second shaft portion 26, and function to prevent pulling-out of the second shaft portion 26 by abutting the edge portion 18A of the through-hole 18.

Figure 4:
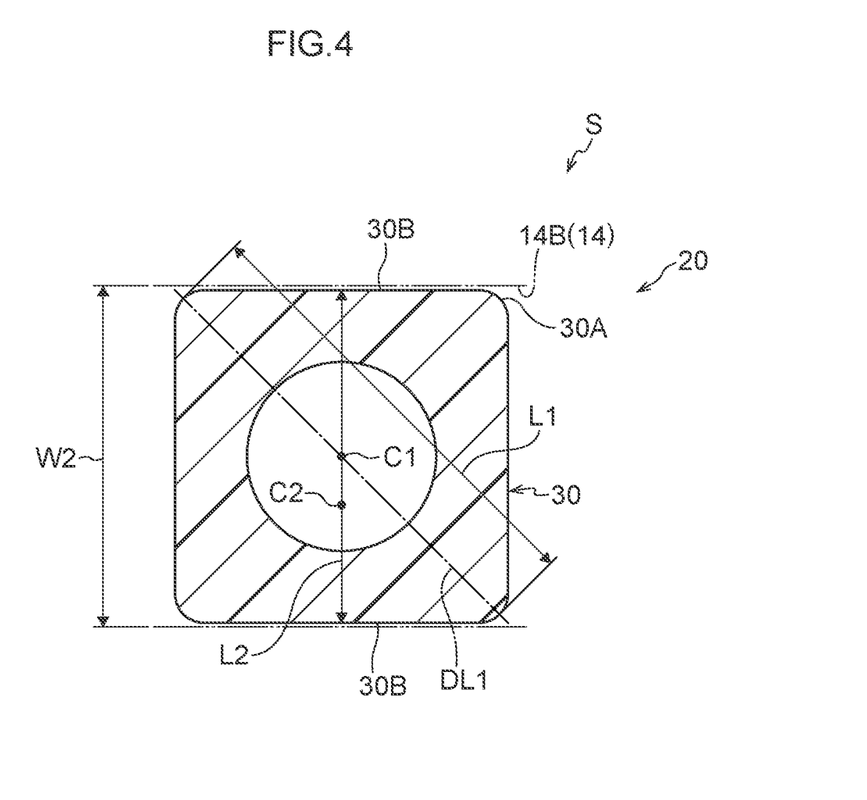
FIG. 4 is a cross-sectional view along line 4X-4X of FIG. 2.

As shown in FIG. 4, the cross-sectional shape of the portion of the first shaft portion 22, which portion is disposed at the inner side of the through-hole 14 in the state in which the first shaft portion 22 is inserted in the through-hole 14, is a polygonal shape. In other words, a positioning portion 30 whose cross-sectional shape is polygonal is formed at the first shaft portion 22 at the portion thereof that is disposed at the inner side of the through-hole 14. Note that what is called the "cross-section" of the first shaft portion 22 here means the cross-section in the direction orthogonal to the axial center C2 of the first shaft portion 22.

At the positioning portion 30, length L1, which runs along a longest diagonal line DL1 that passes-through the axial center C1, is longer than minimum opening width W2 of the through-hole 14. Further, at the positioning portion 30, corner portions 30A of the polygonal shape are curved in circular arc shapes. Note that the length L1 in a case in which the corner portions 30A are curved in circular arc shapes is measured as the distance between points of intersection of the diagonal line DL1 and the corner portions 30A that face one another, in the cross-section of the positioning portion 30.

Note that, in the present embodiment, the cross-sectional shape of the positioning portion 30 is a regular quadrangular shape (a square shape) at which the corner portions 30A are curved in circular arc shapes. At the positioning portion 30, length L2 between wall surfaces 30B that face one another across the axial center C1 is made to be narrower than the minimum opening width W2. Further, the length L2 of the positioning portion 30 is made to be greater than or equal to the opening width W1 of the cut-out 15. Therefore, at the time when the positioning portion 30 of the first shaft portion 22 is inserted in the through-hole 14, the positioning portion 30 is inserted (is fit-in) in a state in which the length L2 of the positioning portion 30 and the opening width W1 of the cut-out 15 are made to coincide with one another. After the positioning portion 30 is inserted in the through-hole 14, the cut-out portion 15 functions to prevent pulling-out.

As shown in FIG. 1 and FIG. 7, the clip 20 of the present embodiment has a first flange portion 32 and a second flange portion 34.

The first flange portion 32 is provided at the second shaft portion 26 side of the first shaft portion 22, and projects out toward the radial direction outer side of the first shaft portion 22. In the state in which the first shaft portion 22 is inserted in the through-hole 14, the edge portion 14A of the through-hole 14 is nipped by the first flange portion 32 and the first anchor portion 24. Due thereto, movement of the first shaft portion 22 with respect to the through-hole 14 in the direction along the axial center C1 is suppressed.

The second flange portion 34 is provided at the first shaft portion 22 side of the second shaft portion 26, and projects out toward the radial direction outer side of the second shaft portion 26. In the state in which the second shaft portion 26 is inserted in the through-hole 18, the edge portion 18A of the through-hole 18 is nipped by the second flange portion 34 and the second anchor portions 28. Due thereto, movement of the second shaft portion 26 with respect to the through-hole 18 in the direction along the axial center C2 is suppressed.

Figure 5:
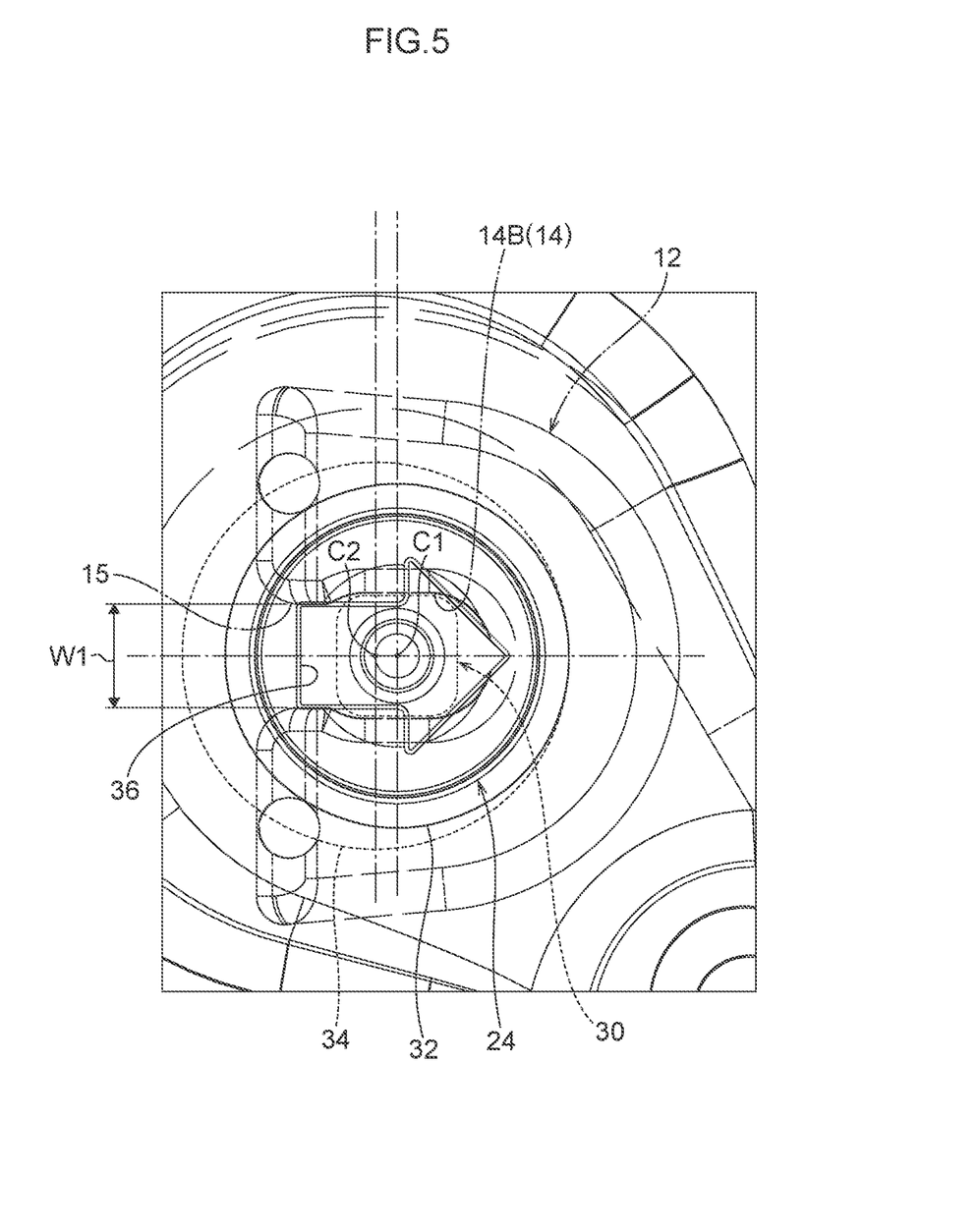
FIG. 5 is a top view of the clip shown in FIG. 1.
Figure 6:
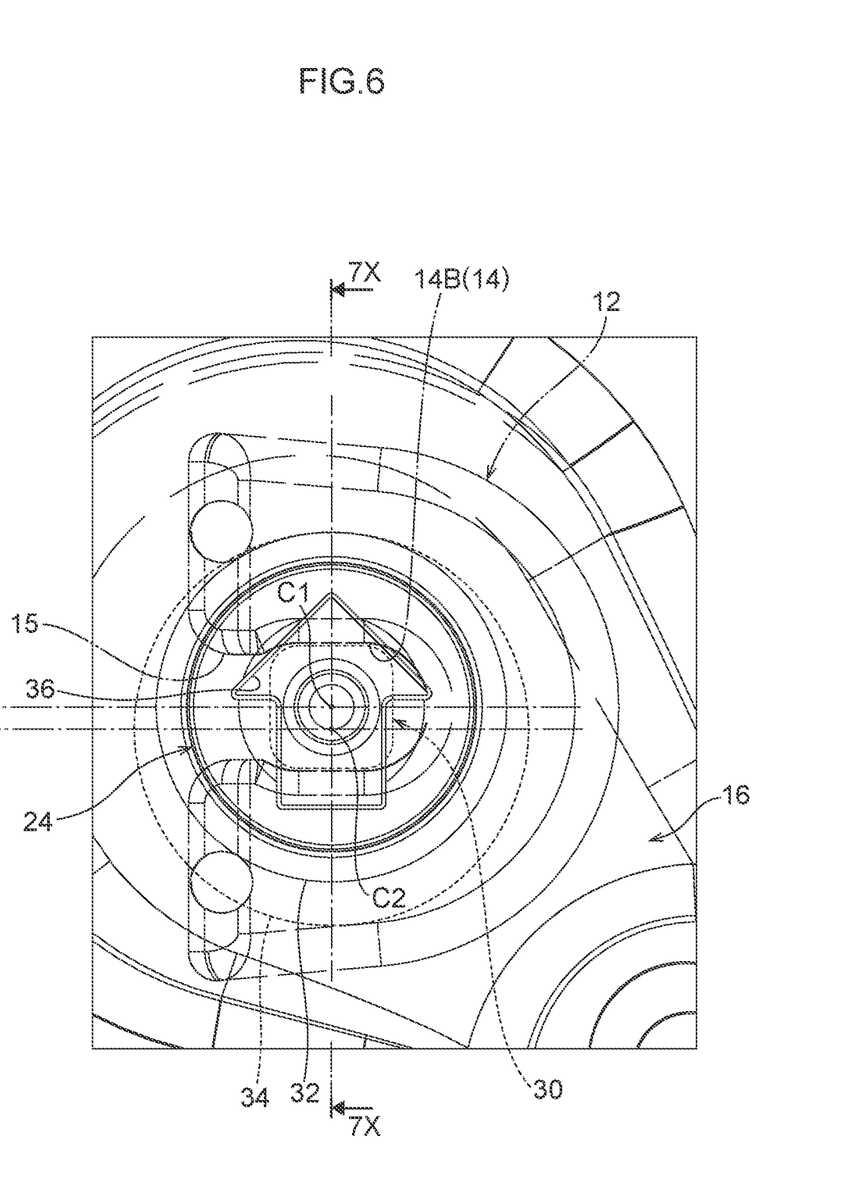
FIG. 6 is a top view of the clip showing a state in which the clip of FIG. 5 has been rotated by 90°.

As shown in FIG. 5 and FIG. 6, the clip 20 of the present embodiment has a direction indicating portion 36.

The direction indicating portion 36 is provided at the one end portion 22A of the first shaft portion 22. In detail, in the present embodiment, a planar surface 38 is formed by one end surface (the top surface in FIG. 7) of the first shaft portion 22 and the top surface of the first anchor portion 24. The direction indicating portion 36 is formed at the planar surface 38. The direction indicating portion 36 indicates the direction of eccentricity of the axial center C1 of the first shaft portion 22 with respect to the axial center C2 of the second shaft portion 26, and is an arrow-shaped recessed portion in the present embodiment. Note that, in the present embodiment, a depression is formed along the axial center C1 of the first shaft portion 22 in a vicinity of the center of the bottom portion of the direction indicating portion 36.

Operation and effects of the mounting structure S and the clip 20 of the present embodiment are described next.

At the mounting structure S, in the state in which the first shaft portion 22 of the clip 20 is inserted in the through-hole 14, the first anchor portion 24 is anchored on the edge portion 14A of the through-hole 14. In the state in which the second shaft portion 26 of the clip 20 is inserted in the through-hole 18, the second anchor portions 28 are anchored on the edge portion 18A of the through-hole 18. Due thereto, the first member 12 is mounted to the second member 16 via the clip 20.

This mounting structure S uses the clip 20 at which the axial center C1 of the first shaft portion 22 and the axial center C2 of the second shaft portion 26 are eccentric with respect to one another. Therefore, the relative positions of the first member 12 and the second member 16 can be adjusted around the first shaft portion 22 or the second shaft portion 26. Further, at the clip 20, the cross-sectional shape of the positioning portion 30 is a polygonal shape. The length L1 that runs along the longest diagonal line DL1 of this polygonal shape is longer than the minimum opening width W2 of the through-hole 14. Therefore, when the first member 12 rotates with respect to the first shaft portion 22, the opposing corner portions 30A of the positioning portion 30 respectively abut the hole wall 14B of the through-hole 14, and rotation of the first member 12 is restricted. Namely, at the time when the first shaft portion 22 is inserted into the through-hole 14, by inserting the first shaft portion 22 into the through-hole 14 while determining the orientation of the first shaft portion 22 with respect to the through-hole 14 in accordance with the relative positions of the first member 12 and the second member 16, the relative positions of the first member 12 and the second member 16 can be maintained. Note that, in FIG. 6, the orientation of the first shaft portion 22 with respect to the through-hole 14 is rotated 90° with respect to FIG. 5.

Due to the above, in accordance with the mounting structure S, the relative positions of the first member 12 and the second member 16 can be adjusted, and the adjusted relative positions can be maintained, by the clip 20.

Further, at the mounting structure S, the cross-sectional shape of the positioning portion 30 of the first shaft portion 22 is a polygonal shape at which the corner portions 30A are rounded in circular arc shapes. Therefore, crushing of the corner portions 30A at the time of restricting rotation of the first member 12 can be suppressed as compared with a case in which, for example, the cross-sectional shape of the positioning portion 30 is a polygonal shape at which the corner portions are angular.

At the mounting structure S, in the state in which the first shaft portion 22 is inserted in the through-hole 14, the edge portion 14A of the through-hole 14 is nipped by the first flange portion 32 and the first anchor portion 24. Therefore, the nipping pressure that is applied to the edge portion 14A of the through-hole 14 becomes nearly uniform.

Further, in the state in which the second shaft portion 26 is inserted in the through-hole 18, the edge portion 18A of the through-hole 18 is nipped by the second flange portion 34 and the second anchor portions 28 of the second shaft portion 26. Therefore, the nipping pressure that is applied to the edge portion 18A of the through-hole 18 becomes nearly uniform.

Due thereto, stable mounting of the first member 12 and the second member 16 by the clip 20 is ensured.

Further, at the mounting structure S, the direction indicating portion 36, which indicates the direction in which the axial center C1 of the first shaft portion 22 is eccentric with respect to the axial center C2 of the second shaft portion 26, is provided at the planar surface 38 that is provided at the first shaft portion 22. Therefore, the direction in which the first shaft portion 22 and the second shaft portion 26 are eccentric with respect to one another can be understood merely by checking the orientation of the direction indicating portion 36. Due thereto, the efficiency of the work of mounting the first member 12 and the second member 16 improves.

Note that, in the mounting structure S of the present embodiment, the first member 12 is a trim member for a vehicle, and the second member 16 is a panel member for a vehicle. Therefore, at the time of manufacturing a vehicle, the relative positions of the first member 12 that is a trim member and the second member 16 that is a panel member can be adjusted, and the adjusted relative positions can be maintained, by using the clip 20. Due thereto, the efficiency of manufacturing the vehicle improves.

In the mounting structure S of the above-described embodiment, the through-hole 14 is connected to the cut-out 15, and the first anchor portion 24 is a portion that projects out from the first shaft portion 22. However, the present disclosure is not limited to this structure. For example, there may be a structure in which the through-hole 14 is a long hole or a circular hole that is not connected to the cut-out 15, and the first anchor portion 24 of the clip 20 is elastic pieces that are similar to the second anchor portions 28, and the first member 12 is mounted to the second member 16.

Further, in the mounting structure S of the above-described embodiment, the first member 12 is a trim member for a vehicle, and the second member 16 is a panel member for a vehicle. However, the present disclosure is not limited to this structure. For example, the first member 12 may be a panel member, and the second member may be a trim member.

Figure 8:
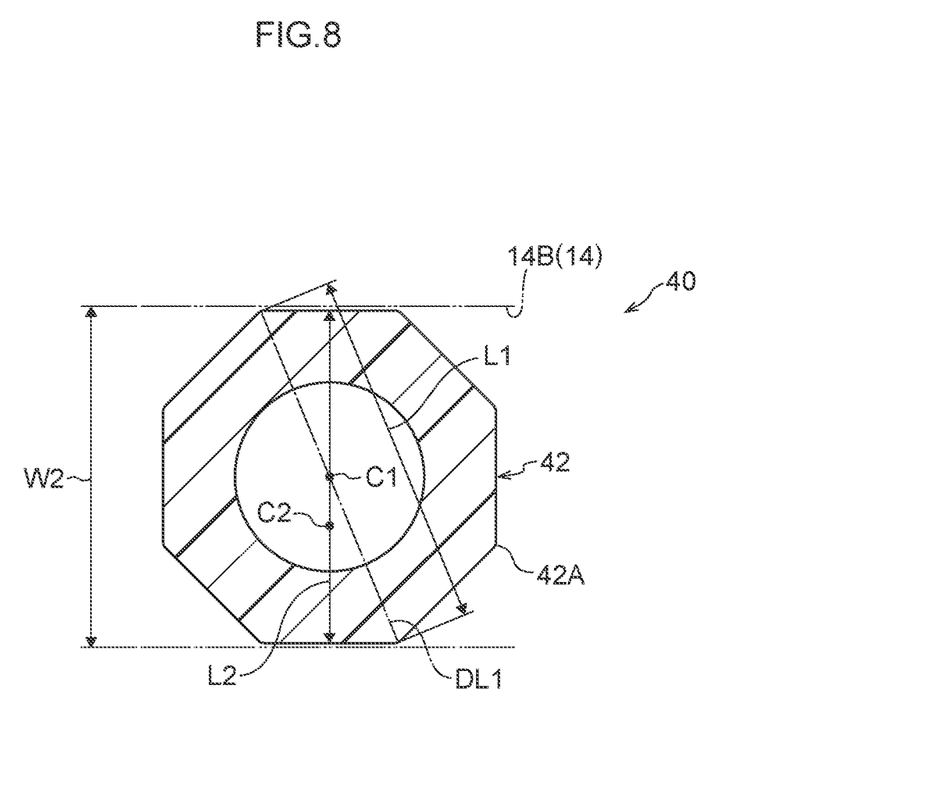
FIG. 8 is an enlarged sectional view (corresponding to the enlarged sectional view of FIG. 7) of the first shaft portion of a clip relating to another embodiment of the present disclosure.
Figure 9:
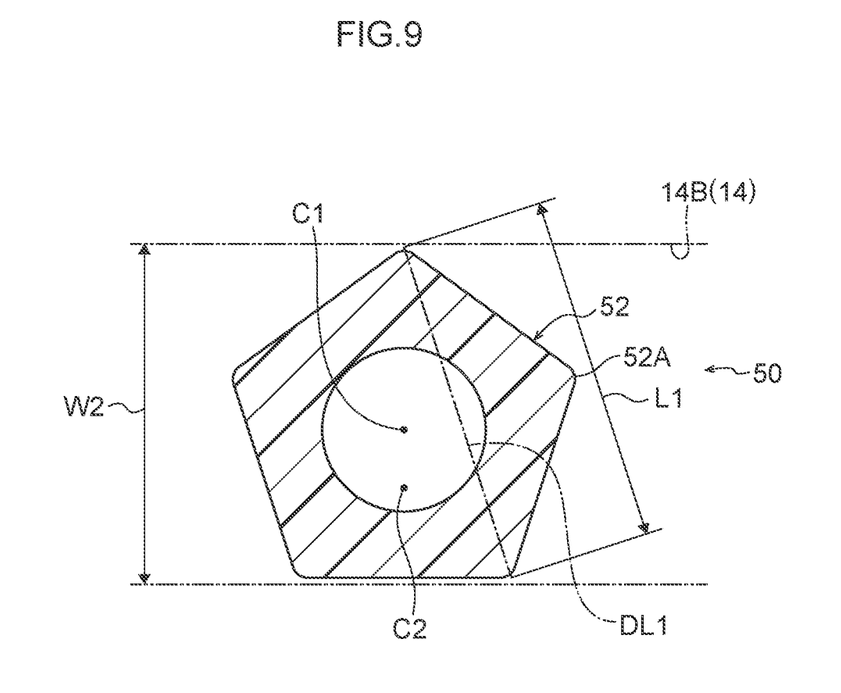
FIG. 9 is an enlarged sectional view (corresponding to the enlarged sectional view of FIG. 7) of the first shaft portion of a clip relating to another embodiment of the present disclosure.
Figure 10:
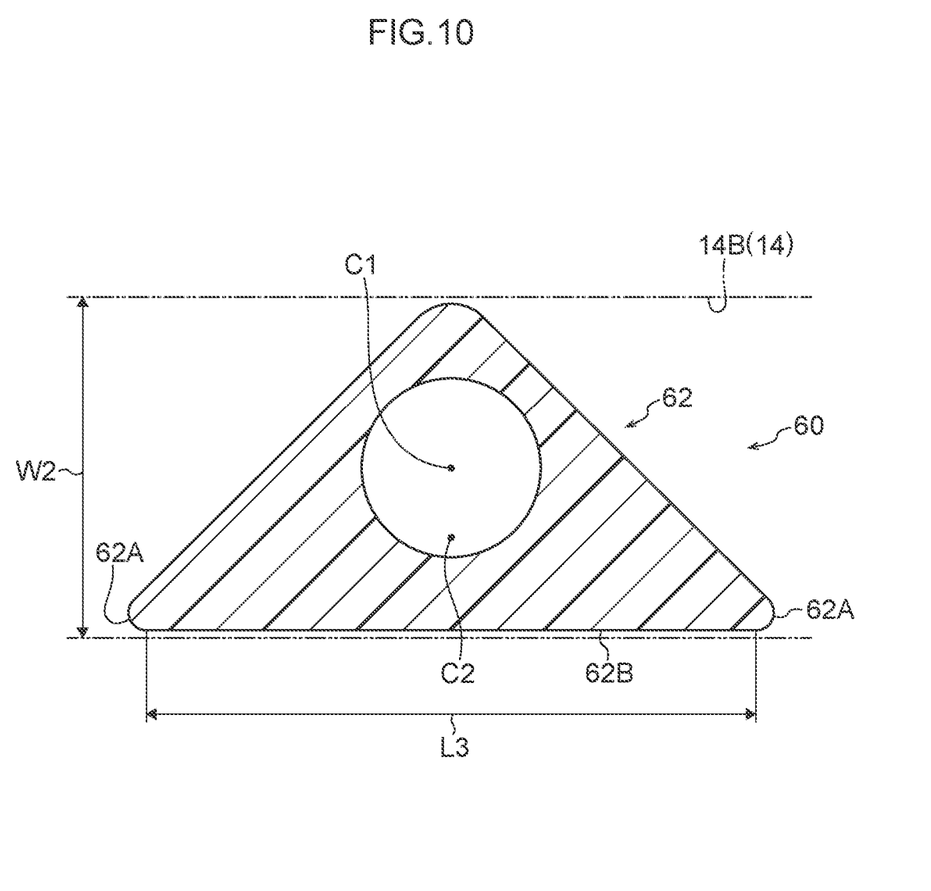
FIG. 10 is an enlarged sectional view (corresponding to the enlarged sectional view of FIG. 7) of the first shaft portion of a clip relating to another embodiment of the present disclosure.
Figure 11:
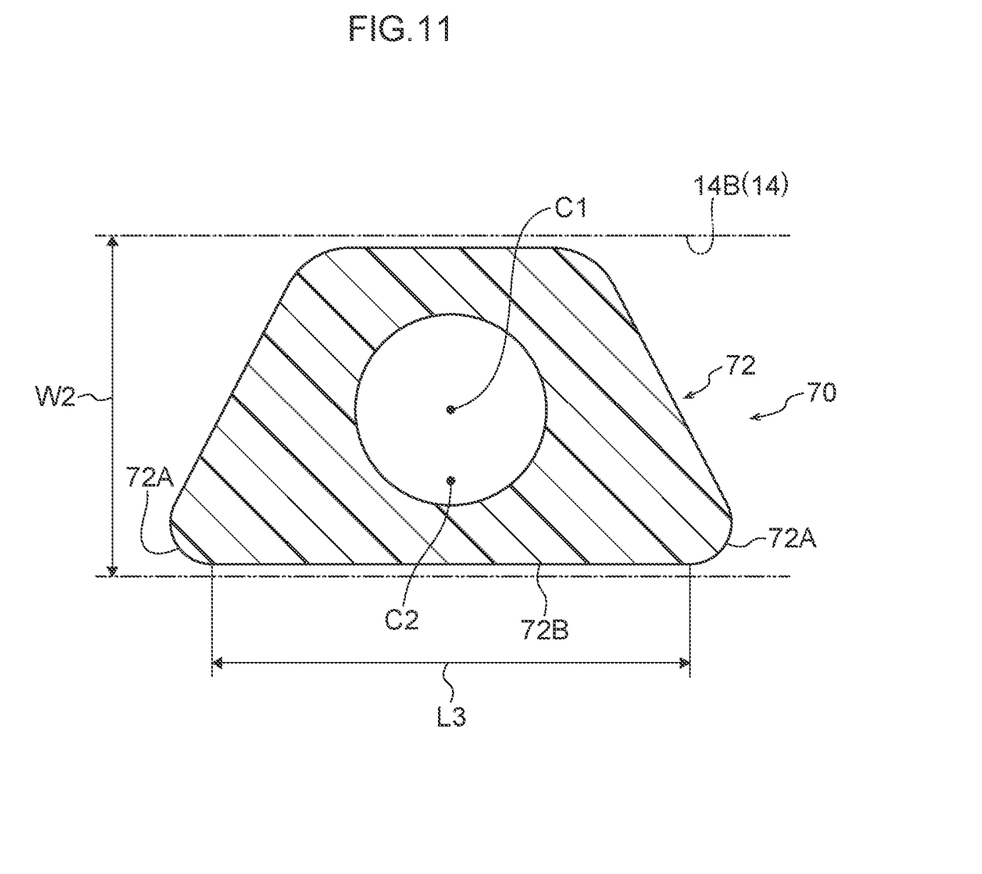
FIG. 11 is an enlarged sectional view (corresponding to the enlarged sectional view of FIG. 7) of the first shaft portion of a clip relating to another embodiment of the present disclosure.

In the clip 20 of the above-described embodiment, the cross-sectional shape of the positioning portion 30 is a regular quadrangular shape at which the corner portions 30A are rounded in circular arc shapes, but the present disclosure is not limited to this structure. For example, the cross-sectional shape of the positioning portion 30 may be a regular quadrangular shape in which the corner portions are angular. Further, the cross-sectional shape of the positioning portion of the clip in the present disclosure is not particularly limited provided that it is a polygonal shape. For example, as with a clip 40 that is shown in FIG. 8, the cross-sectional shape of a positioning portion 42 may be a regular octagonal shape at which corner portions 42A are curved in circular arc shapes. Or, as with a clip 50 that is shown in FIG. 9, the cross-sectional shape of a positioning portion 52 may be a regular pentagonal shape at which corner portions 52A are curved in circular arc shapes. Moreover, as with a clip 60 that is shown in FIG. 10, the cross-sectional shape of a positioning portion 62 may be a right triangular shape at which corner portions 62A are curved in circular arc shapes. Or, as with a clip 70 that is shown in FIG. 11, the cross-sectional shape of a positioning portion 72A may be a trapezoidal shape at which corner portions 72A are curved in circular arc shapes. Note that, in the case of the clip 60, length L3 of the longest side (longest wall surface 62B) among the three sides of the positioning portion 62 whose cross-sectional shape is right triangular is longer than the minimum opening width W2 of the through-hole 14. Therefore, when the first member 12 rotates with respect to the first shaft portion 22, the corner portions 62A, which face one another with the longest side of the positioning portion 62 therebetween, respectively abut the hole wall 14B of the through-hole 14, and rotation of the first member 12 is restricted. Also at the clip 70 that is shown in FIG. 11, in the same way as at the clip 60, the length L3 of the longest side (longest wall surface 72B) among the four sides of the positioning portion 72 whose cross-sectional shape is trapezoidal is longer than the minimum opening width W2 of the through-hole 14. Note that, at the clip 70, the length L3 of the longest side is longer than the length that runs along the diagonal line. Therefore, when the first member 12 rotates with respect to the first shaft portion 22, the corner portions 72A, which face one another with the longest side of the positioning portion 72 therebetween, respectively abut the hole wall 14B of the through-hole 14, and rotation of the first member 12 is restricted.

Still further, the respective wall surfaces of the positioning portion 30 may be recessed toward the axial center C1, or the respective wall surfaces of the positioning portion 42 may be recessed toward the axial center C1. Similarly, the respective wall surfaces of the positioning portion 52 may be recessed toward the axial center C1, or the respective wall surfaces of the positioning portion 62 may be recessed toward the axial center C1, or the respective wall surfaces of the positioning portion 72 may be recessed toward the axial center C1.

Further, at the clip 20 of the above-described embodiment, the arrow-shaped recessed portion that serves as the direction indicating portion 36 is formed in the planar surface 38, but the present disclosure is not limited to this structure. For example, a convex portion that is arrow-shaped and serves as a direction indicating portion may be formed at the planar surface 38. Further, at the clip 20, the direction indicating portion 36 is formed on the planar surface 38 that is formed by the first shaft portion 22, but, instead, the direction indicating portion 36 that indicates the direction of eccentricity may be formed at the second shaft portion 26, or direction indicating portions may be formed at both the first shaft portion 22 and the second shaft portion 26.

Although an embodiment of the present disclosure has been described above, the present disclosure is not limited to the above, and, of course, can be implemented by being modified in various ways other than the above within a scope that does not depart from the gist thereof.

What is claimed is:

1. A mounting structure comprising:
a first member in which a first through-hole is formed;
a second member in which a second through-hole is formed, and to which the first member is mounted; and
a clip having a first shaft portion that is inserted in the first through-hole, a first anchor portion that is provided at one end portion side of the first shaft portion and is anchored on an edge portion of the first through-hole, a second shaft portion that is provided at another end portion of the first shaft portion and is inserted in the second through-hole, and whose axial center is eccentric with respect to an axial center of the first shaft portion, and a second anchor portion that is provided at the second shaft portion and is anchored on an edge portion of the second through-hole,
wherein a cross-sectional shape of a portion, which is disposed at an inner side of the first-through hole, of the first shaft portion is a polygonal shape,
wherein a length along a longest diagonal line of the polygonal shape, or a length of a longest side of the polygonal shape, is longer than a minimum opening length of the first through-hole, and
wherein the clip is formed of a single piece.

2. The mounting structure of claim 1, wherein corner portions of the polygonal shape are curved in circular arc shapes.

3. The mounting structure of claim 1, wherein:
a first flange portion that projects out toward a radial direction outer side of the first shaft portion is provided at a second shaft portion side of the first shaft portion, and an edge portion of the first through-hole is nipped by the first flange portion and the first anchor portion, and
a second flange portion that projects out toward a radial direction outer side of the second shaft portion is provided at a first shaft portion side of the second shaft portion, and an edge portion of the second through-hole is nipped by the second flange portion and the second anchor portion.

4. The mounting structure of claim 1, wherein a direction indicating portion, which indicates a direction in which the first shaft portion and the second shaft portion are eccentric with respect to one another, is provided at least one of the first shaft portion or the second shaft portion.

5. The mounting structure of claim 1, wherein:
the first member is either one of a trim member for a vehicle or a panel member for a vehicle, and
the second member is another of the trim member for a vehicle or the panel member for a vehicle.

6. The mounting structure of claim 1, wherein:
corner portions of the polygonal shape are curved in circular arc shapes,
a first flange portion that projects out toward a radial direction outer side of the first shaft portion is provided at a second shaft portion side of the first shaft portion, and an edge portion of the first through-hole is nipped by the first flange portion and the first anchor portion,
a second flange portion that projects out toward a radial direction outer side of the second shaft portion is provided at a first shaft portion side of the second shaft portion, and an edge portion of the second through-hole is nipped by the second flange portion and the second anchor portion, and
a direction indicating portion, which indicates a direction in which the first shaft portion and the second shaft portion are eccentric with respect to one another, is provided at at least one of the first shaft portion or the second shaft portion.

7. A clip for mounting a first member to a second member, the clip comprising:
a first shaft portion that is inserted in a first through-hole formed in the first member;
a first anchor portion that is provided at one end portion side of the first shaft portion, and that is anchored on an edge portion of the first through-hole;
a second shaft portion that is provided at another end portion of the first shaft portion, that is inserted in a second through-hole formed in the second member, and whose axial center is eccentric with respect to an axial center of the first shaft portion; and
a second anchor portion that is provided at the second shaft portion, and that is anchored on an edge portion of the second through-hole, wherein a cross-sectional shape of a portion, which is disposed at an inner side of the first-through hole, of the first shaft portion is a polygonal shape, wherein a length along a longest diagonal line of the polygonal shape, or a length of a longest side of the polygonal shape, is longer than a minimum opening length of the first through-hole, and wherein the clip is formed of a single piece.

\* \* \* \* \*